United States Patent [19]

Marek

[11] Patent Number: 4,705,937

[45] Date of Patent: Nov. 10, 1987

[54] APPARATUS FOR AUTOMATICALLY CONTROLLING THE TEMPERATURE OF WELDING BANDS

[75] Inventor: Rainer Marek, Rheine, Fed. Rep. of Germany

[73] Assignee: Windmöller & Hölscher, Lengerich, Fed. Rep. of Germany

[21] Appl. No.: 860,815

[22] Filed: May 8, 1986

[30] Foreign Application Priority Data

May 8, 1985 [DE] Fed. Rep. of Germany ....... 3516601

[51] Int. Cl.$^4$ .............................................. H05B 1/02
[52] U.S. Cl. ................................... 219/497; 219/501; 219/535; 219/544; 219/505; 156/272.2; 156/273.9; 285/280; 264/272.11
[58] Field of Search ............... 219/494, 497, 499, 501, 219/504, 505, 528, 535, 544; 156/272.2, 273.9, 274.2, 86, 304.2, 379.6; 285/280, 292; 264/292.11

[56] References Cited

U.S. PATENT DOCUMENTS

| | | | |
|---|---|---|---|
| 4,172,555 | 10/1979 | Levine | 236/46 |
| 4,523,084 | 6/1985 | Tamura et al. | 219/497 |
| 4,554,439 | 11/1985 | Cross et al. | 219/497 |
| 4,602,148 | 7/1986 | Ramsey | 219/535 |

FOREIGN PATENT DOCUMENTS

| | | |
|---|---|---|
| 2604522 | 8/1976 | Fed. Rep. of Germany . |
| 2549651 | 12/1976 | Fed. Rep. of Germany . |
| 3021982 | 12/1980 | Fed. Rep. of Germany . |
| 1520556 | 8/1978 | United Kingdom . |

Primary Examiner—M. H. Paschall
Attorney, Agent, or Firm—Fleit, Jacobson, Cohn & Price

[57] ABSTRACT

A device for automatically controlling the temperature of welding bands consisting of a dividing circuit for determining the temperature of the welding band. A controller is provided to control the output power of the heating circuit in dependence upon the deviation of the determined actual temperature of the welding band from a predetermined desired value. The output voltage of the dividing circuit is an analog voltage representing the high-temperature resistance of the welding band, and is applied to a second dividing circuit with an analog voltage representing the low-temperature resistance of the welding band. This generates an analog voltage representing the quotient of the two input voltages of the second dividing circuit. This output voltage is multiplied in a multiplying circuit with the output voltage generated by an analog adder as the sum of an analog voltage representing the low-temperature at which the low temperature resistence of the welding band has been measured and an auxiliary analog voltage, which represents a calculated auxiliary temperature. A first subtracting circuit provides for subtracting the auxiliary voltage from the output voltage of the multiplying circuit and for generating an analog voltage which represents the actual temperature of the hot welding band. A second subtracting circuit is provided, which generates a differential voltage representing the difference between the analog voltage representing the determined actual temperature of the welding band and the analog voltage representing the predetermined desired temperature of the welding band and applies this differential voltage to the controller.

5 Claims, 3 Drawing Figures

APPARATUS FOR AUTOMATICALLY CONTROLLING THE TEMPERATURE OF WELDING BANDS

BACKGROUND OF THE INVENTION

1. Field of the Invention

This invention relates to apparatus for automatically controlling the temperature of welding bands used to weld plastic films or the like. Such weld bands are commonly found on plastic bag making machines. The inventive apparatus basically comprises a dividing circuit for determining the temperature of the welding band in dependence on the output voltage and current of the circuit used to heat the welding band and a controller for controlling the output power of the heating circuit in dependence of the deviation of the actual temperature of the welding band from a predetermined desired value.

2. Description of the Prior Art

In the operation of known apparatus for controlling the temperature of welding bands, such as is known from U.K. Patent Specification No. 1 520 556 (incorporated by reference herein), a recognized phenomenon is utilized. Accordingly, the resistance of the sealing band increases with temperature so that the temperature of the welding band can be determined in dependence on its resistance ($\theta W = f(Us/Is)$), wherein $\theta W$ is the temperature of the hot welding band and Us and Is are the output voltage and current, respectively, of the heating circuit. In the known apparatus the temperature of the welding band is determined with reference to its actual resistance. A dividing circuit causes a controller to control the current flowing in the heating circuit so that the current supplied to the welding band will maintain the welding band at the desired, constant temperature.

The known apparatus will operate satisfactorily if the welding bands employed have the same geometric configuration and the same composition. In that case the parameters and properties of the welding bands can be taken into account in the measurement of the actual values and the determination of the desired value.

But in fact, welding bands differ in geometrical dimensions and in composition so that expensive adjusting operations are required in the known apparatus when a welding band has been replaced if the actual temperature of the new welding band is to be controlled to match the predetermined desired temperature with adequate accuracy.

SUMMARY OF THE INVENTION

For this reason it is an object of the invention to improve the apparatus described first hereinbefore that the apparatus can simply and quickly be adjusted to match the welding band employed and in particular after a replacement of a welding band can simply and quickly be adjusted to match the possibly different dimensions and composition of the new welding band.

This object is accomplished in accordance with the invention in which the output voltage of a dividing circuit, which output voltage is an analog voltage representing the high-temperature resistance of the welding band, and an analog voltage representing the low-temperature resistance of the welding band, are applied as input voltages to a second dividing circuit, which generates an analog voltage representing the quotient of the two input voltages of the second dividing circuit. The output voltage of the second dividing circuit is multiplied in a multiplying circuit with the output voltage generated by an analog adder as the sum of an analog voltage representing the low-temperature at which the low-temperature resistance of the welding band has been measured and an auxiliary analog voltage, which represents a calculated auxiliary temperature. A first subtracting circuit is provided for subtracting the auxiliary voltage from the output voltage of the multiplying circuit and for generating an analog voltage which represents the actual temperature of the hot welding band, and a second subtracting circuit is provided, which generates a differential voltage representing the difference between the analog voltage representing the determined actual temperature of the welding band and the analog voltage representing the predetermined desired temperature of the welding band and applies the differential voltage to a controller.

In the known apparatus, control of the temperature of the welding band depends on a predetermined resistance, which corresponds to a predetermined desired temperature of the welding band. In the apparatus in accordance with the present invention, the temperature of the hot welding band is determined in accordance with the equation $$\theta W = Rw/Rk\,(\tau + \theta K) - \tau$$

wherein $\theta W$ is the temperature of the hot welding band, $\theta K$ is the temperature of the cold welding band at which the low-temperature resistance of the welding band has been measured, Rw is the resistance of the hot welding band, Rk is the resistance of the cold welding band, and $\tau = 1/\alpha 20 - 20°$ C. is a calculated auxiliary temperature. In the operation of apparatus in accordance with the invention, only the low-temperature resistance of the welding band and the low temperature at which the resistance has been measured must be determined by measurements and corresponding analog voltages must be applied to the arithmetic circuit. The low-temperature resistance is usually stated by the manufacturer of the welding band and in that case need not be measured. The temperature coefficient $\alpha 20$ is also a material constant stated by the manufacturer and may be delivered to the arithmetic circuit.

The analog voltage representing the low-temperature resistance of the welding band is suitably generated by a voltage divider, which consists of a potentiometer, which may be provided with a suitably calibrated scale so that the analog voltage representing the low-temperature resistance will be tapped from the potentiometer when it has been adjusted to the proper value.

The analog voltage representing the temperature at which the low-temperature resistance of the welding band has been measured may also be generated by a voltage divider which consists of a potentiometer, which may also be provided with a scale permitting convenient adjustment.

It is known that the temperature coefficient varies also with temperature. For this reason it is within the scope of the invention to derive from the output voltage of the dividing circuit the analog voltage which represents the temperature-dependent temperature coefficient $\alpha$ and influences the analog voltage representing the calculated auxiliary temperature and to provide for this purpose a function network made up of an addressable memory in which those analog voltages representing the temperature coefficient $\alpha$ which are associated with the instantaneous output voltages of the dividing circuit are stored in a look-up table.

Within the scope of the invention the apparatus comprises, for determining the low-temperature resistance of the welding band, a circut which by means of a motor contoller and a servomotor adjusts the voltage divider to the analog voltage representing the low-temperature resistance to be determined.

A circuit for determining the low-temperature at which the low-temperature resistance of the welding band has been measured may also be provided and may be arranged to adjust by means of a controller and a servomotor the voltage divider to generate the analog voltage representing the determined low-temperature.

DETAILED DESCRIPTION OF THE PREFERRED EMBODIMENTS

Figure 1:
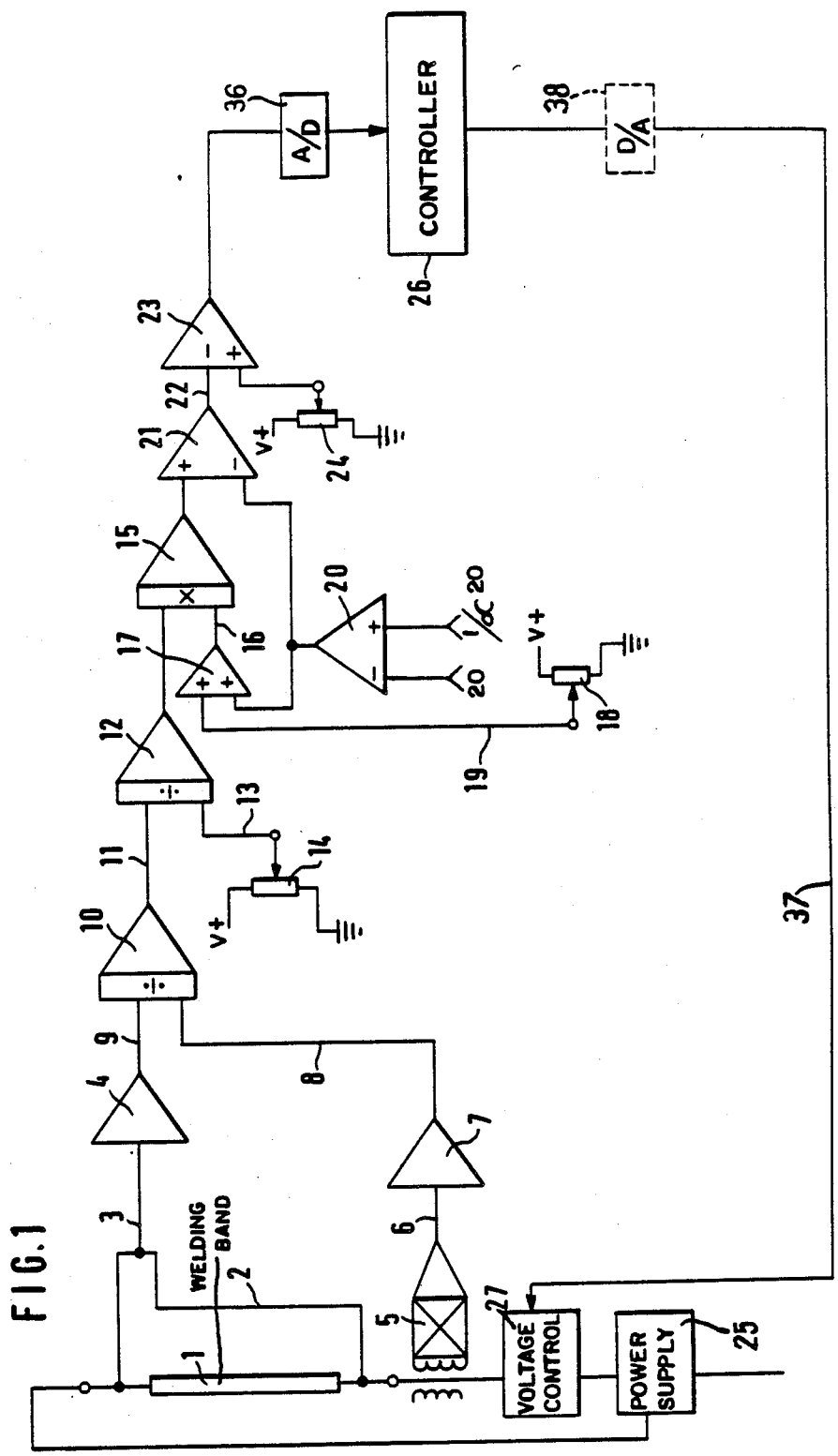
FIG. 1 is a schematic circuit diagram of a first embodiment of apparatus for automatically controlling the temperature of welding bands. In that circuit, data representing the measured low-temperature resistance and the measured low-temperature at which the resistance has been measured are entered manually.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Illustrative embodiments of the invention will now be described more in detail with reference to the drawing.

FIG. 1 is a block circuit diagram showing a welding band 1, which is included in a heating circuit that also includes a power supply 25 and a voltage control 27. The welding band is part of another apparatus such as in the welding section of a conventional plastic bag making machine. As shown schematically, the voltage Us applied to the welding band 1 is measured and is applied via leads 2, 3 to an amplifier 4. A current sensor 5, which may consist of a conventional ammeter, is used to determine the current Is flowing in the heating circuit and to generate an analog voltage representing that current. That voltage is applied via lead 6 to an amplifier 7. The analog output voltages generated by the amplifiers 4 and 7, respectively, are applied via leads 8 and 9 to a dividing circuit 10, which generates an analog voltage representing the quotient Us/Is. That analog voltage is a function of and varies according to the high-temperature resistance Rw of the heating band 1 and is applied via line 11 to a second dividing circuit 12. An additional analog voltage representing the low-temperature resistance Rk is applied to the dividing circuit 12 via lead 13.

The last-mentioned analog voltage is adjusted by means of the potentiometer 14 to match the previously measured resistance of the newly employed welding band 1 in a cold state, e.g., at a temperature of 20°, 30° or 40° C. In dependence on the voltages applied via leads 11 and 13, respectively, the dividing circuit 12 generates an analog voltage which corresponds to the quotient Rw/Rk. The output voltage of the dividing circuit 12 is applied to the multiplying circuit 15. An additional voltage is generated by the analog adder 17 and is applied via lead 16 also to the multiplying circuit 15.

The analog adder 17 operates to add analog voltages which represent the low-temperature $\theta k$ and the calculated auxiliary temperature $\tau$. The analog voltage representing the low temperature $\theta k$ is tapped from the potentiometer 18, which is provided with a temperature scale that has been calculated according to the temperature at which the low-temperature resistance of the newly employed band has been measured. The temperature values indicated on the scale correspond to the associated analog voltages. That voltage is applied via lead 19.

The second voltage which is added is an analog voltage representing the auxiliary temperature $\tau$ and has been generated by the subtracting circuit, to which analog voltages are applied which respectively represent the temperature values $1/\alpha$ 20 and 20° C. These values are manually set by the user and provided to the inputs of amplifier 20.

The analog voltage corresponding to the calculated temperature $\tau$ is applied not only to the analog adder 17 but also to the subtracting circuit 21. The output voltage of the multiplying circuit 15 is also applied to the subtracting circuit 21. In dependence on the difference between the two input voltages applied to the subtracting voltage 21, the latter generates an output voltage which corresponds to the temperature $\theta W$ of the hot welding band. Via lead 22, that voltage is applied to an additional subtracting circuit 23, in which said input voltage is compared with a voltage that has been adjusted by means of a potentiometer 24 and represents the desired temperature of the welding band. A differential voltage representing the difference between the input voltages of the additional subtracting circuit 23 is applied through an analog-to-digital (A/D) converter 36 to a controller 26, which in a preferred embodiment is a conventional microprocessor. The controller includes a dedicated memory, which may be either programmable or permanent. The dedicated memory is configured to contain a look-up table of digital values that represent the values of a control signal applied to the voltage control 27 via leads 37 in order to increase or decrease the power applied to the welding band 1 resulting in a corresponding increase or decrease of the temperature of the welding band. The values stored in the dedicated memory are derived empirically based on the observed effect of changes in the heat produced and the heat resistance of the welding band 1 in response to changes in the power supplied to the welding band.

The voltage control 27 may take the form of other conventional devices, such as a current control, with the primary purpose being to adjust the power applied to the welding band from the power supply in accordance with the control signal. Optionally, the control signal from the controller 26 may pass through a digital-to-analog (D/A) converter 38 (shown in phantom) depending on whether the voltage control 27 is responsive to a digital or analog control signal.

Figure 2:
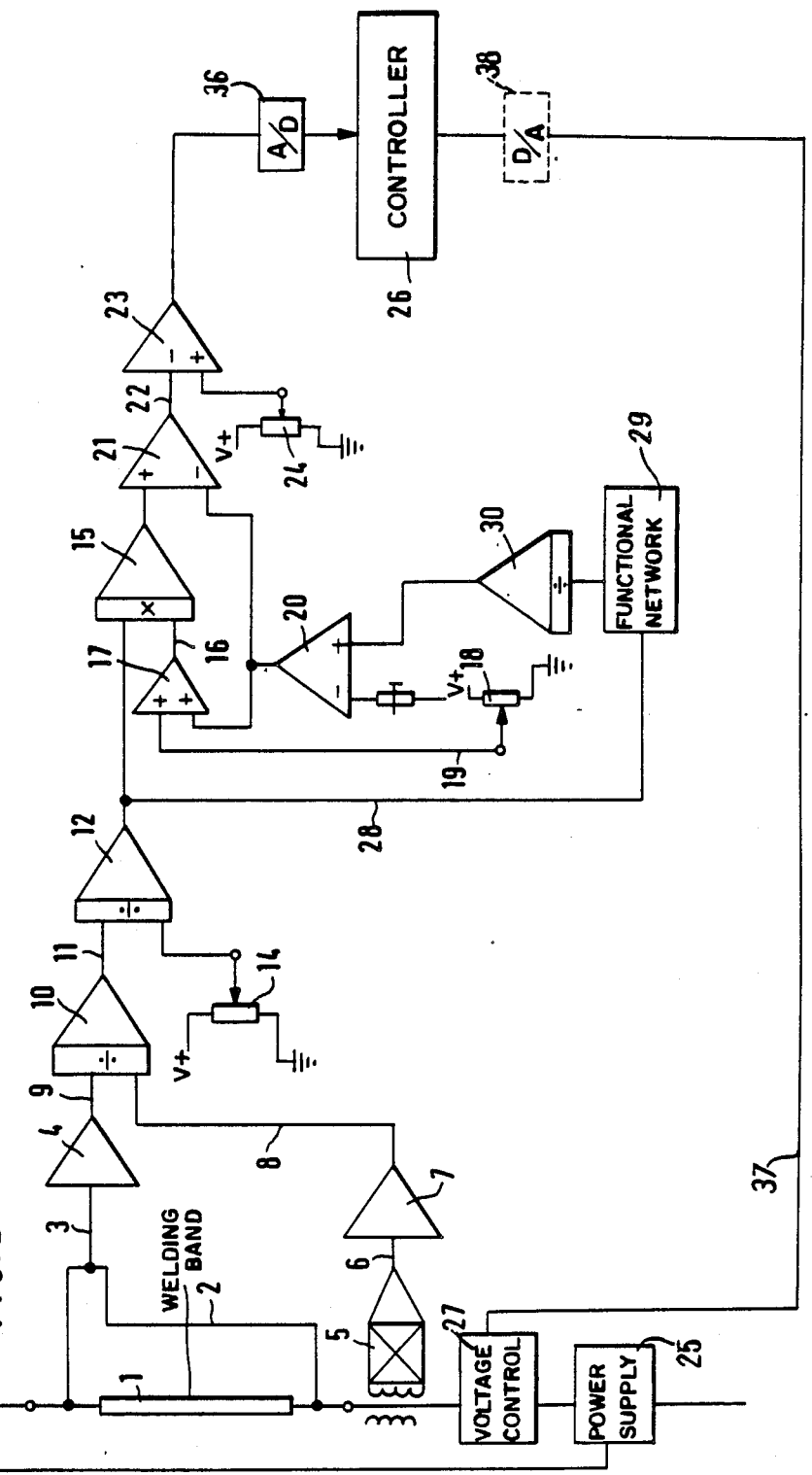
FIG. 2 is a schematic circuit diagram of a circuit arrangement which generally corresponds to that of FIG. 1 and is additionally provided with a circuit for determining the temperature-dependent coefficient.

The illustrative embodiment shown schematically in the block circuit diagram of FIG. 2 differs from the embodiment of FIG. 1 by the provision of a function network 29 for generating an analog voltage representing the actual temperature coefficient $\alpha$. The elements in FIG. 2 that are the same as the elements in FIG. 1 bear the same reference numerals. The analog voltage $\alpha$ is a function of the quotient Rw/Rk. The values corresponding to the analog voltage representing Rw/Rk are stored in the function network 29, which is connected by lead 28 to the output of the dividing circuit 12. The function network 29 is also connected to the dividing circuit 30, which generates an analog voltage representing the quotient $1/\alpha$. That analog voltage is one of the voltages applied to the subtracting circuit 20.

It will be appreciated that in the embodiment shown in FIG. 2 the actual temperature coefficient obtained at different temperatures of the welding band is always taken into account. The values represented by the output signals of the function network 29 have previously been empirically determined or have been stated by the manufacturer of the welding band. In a preferred embodiment, the function network comprises a replaceable or programmable memory. The memory may take the form of a RAM or ROM that contains in the form of a look-up table the values representing the output signals. The function network also includes the circuitry, e.g. D/A converter, necessary to ensure that the output signals are in analog form for receipt by divider 30.

Figure 3:
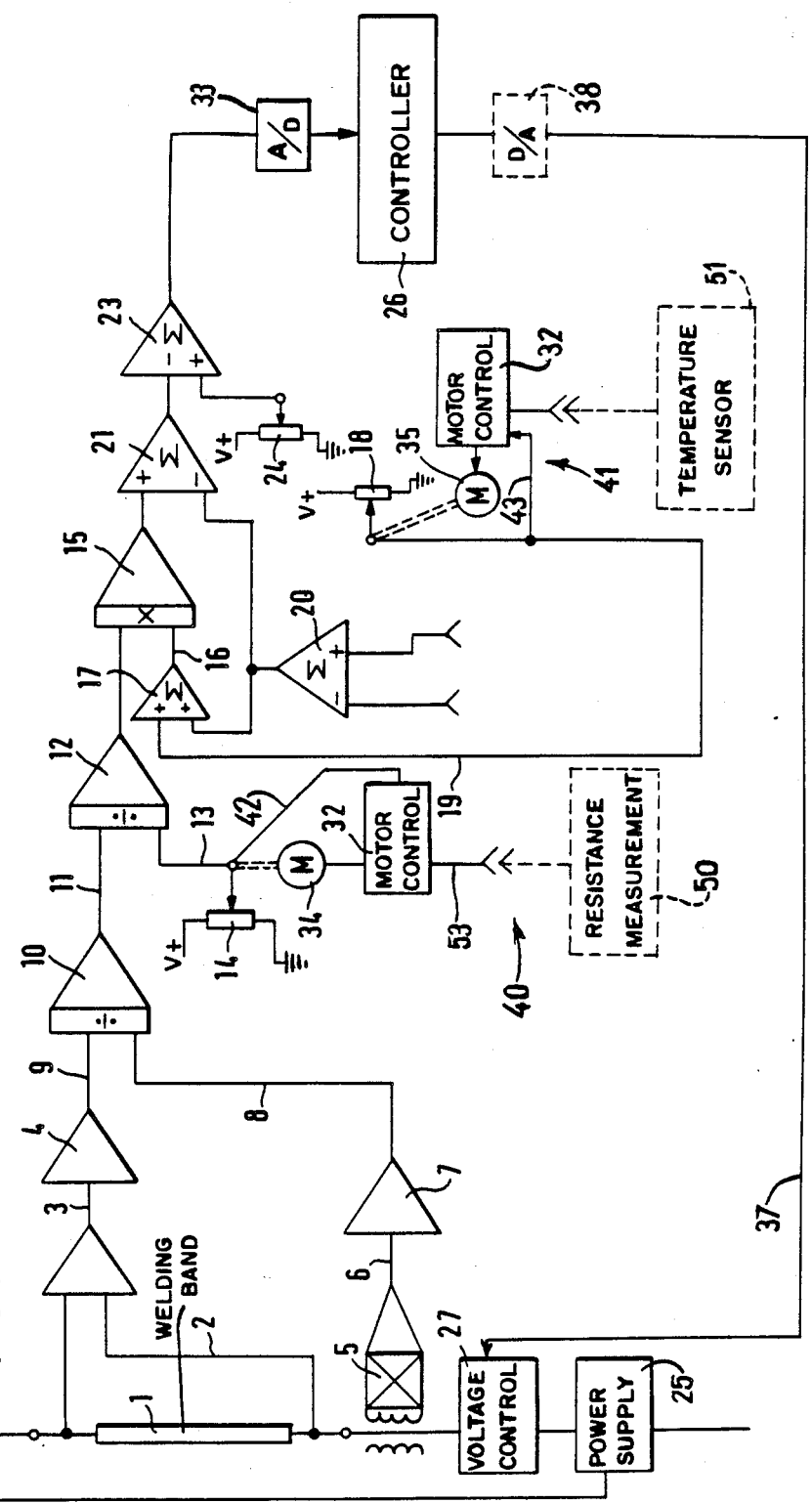
FIG. 3 is a schematic circuit diagram of a circuit arrangement which generally corresponds to that of FIG. 1 and includes additional measuring circuits for determining the low-temperature resistance of the welding band and the low-temperature of the welding band at which the resistance has been measured.

The illustrative embodiment shown schematically in FIG. 3 differs from the embodiment of FIG. 1 by the inclusion of circuits 40, 41 for determining the low-temperature resistance Rk of the welding band 1 and the temperature $\theta k$ at which that low-temperature resistance has been measured. The elements in FIG. 3 that are the same as the elements in FIG. 1 bear the same reference numerals. Analog voltages representing the measured values are applied to motor control circuits 32, 33 for controlling servomotors 34, 35 for adjusting the potentiometers 14, 18 for generating analog voltages which represent the low-temperature resistance Rk and the low temperature $\theta k$. Motor control 32 is a conventional device that merely compares an input signal, representative of the low-temperature resistance Rk, with a feedback signal on line 42 in order to produce a motor signal on line 48 to cause the servomotor 34 to adjust the potentiometer 14. Motor control 33 operates in the same way as motor control 32 when interacting with the input signal on line 44, the feedback signal on lines 43, the motor 35 and the potentiometer 18. It will be understood that the circuit arrangement shown in FIG. 3 permits a temperature control which is accurately and reliably controlled and is independent of manufacturer's information and of previously taken measurements.

The signal to motor control 32 is fed in via input 53 either manually by the user or automatically by a resistance sensor 50 (shown in phantom), such as a Whetstone Bridge. The same is true of the signal to motor control 33 that is fed in via input 44. The signal is input either manually by the user or automatically by a temperature sensor 51 (shown in phantom).

From the above, it is apparent that many modifications and variations of the present invention are possible in light of the above teachings. It is therefore to be understood that, within the scope of the apended claims, the invention may be practiced otherwise than as specifically described.

I claim:

1. Apparatus for automatically controlling the temperature of welding bands used to weld plastic films or the like, comprising
   a heating circuit for causing said welding band to heat up;
   first dividing means, an analog voltage representing the voltage applied to the welding band, and an analog voltage representing the current flowing through the heating circuit being applied as input voltages to said first dividing means which generates an output voltage representing the quotient of said two input voltages of said first dividing means;
   controller means for controlling the output power of the heating circuit in dependence of the deviation of the determined actual temperature of the welding band from a predetermned desired value;
   second dividing means, said output voltage of said first dividing means, which output voltage is an analog voltage representing the high-temperature resistance of the welding band, and an analog voltage representing the low-temperature resistance of the welding band being applied as input voltages to said second dividing means, which generates a second analog voltage representing the quotient of said two input voltages of said second dividing means;
   multiplying means, said second analog voltage being multiplied in said multiplying means with the output voltage generated by an analog adder as the sum of an analog voltage representing the low temperature at which the low-temperature resistance of the welding band has been measured and an auxiliary analog voltage, which represents a calculated auxiliary temperature;
   first subtracting means for subtracting the auxiliary voltage from the output voltage of said multiplying means and for generating an analog voltage which represents the actual temperature of the hot welding band; and
   second subtracting means, which generates a differential voltage representing the difference between the analog voltage representing the determined actual temperature of the welding band and the analog voltage representing the predetermined desired temperature of the welding band.

2. Apparatus according to claim 1, wherein a potentiometer is provided as a voltage divider for generating the analog voltage representing the low-temperature resistance of the welding band.

3. Apparatus according to claim 1, wherein a potentiometer is provided as a voltage divider for generating an analog voltage representing the low-temperature of the welding band at which the low-temperature resistance of the welding band has been measured.

4. Apparatus according to claim 1, further comprising a function network for deriving from the output voltage of said second dividing means an analog value which represents the temperature-dependent temperature coefficient and which influences the analog voltage representing the calculated auxiliary temperature, analog values of the temperature coefficients associated with respective output voltages of said second dividing means being stored in said function network.

5. Apparatus according to claim 3, further comprising means for determining the low-temperature of the welding band at which the low-temperature resistance of the welding band has been measured to adjust by means of a servomotor the voltage divider to generate an analog voltage corresponding to the determined low-temperature.

* * * * *